US010028276B2

(12) United States Patent
Jeong et al.

(10) Patent No.: US 10,028,276 B2
(45) Date of Patent: Jul. 17, 2018

(54) NODE DEVICE AND METHOD OF ALLOCATING RESOURCES IN WIRELESS SENSOR NETWORKS

(71) Applicant: ELECTRONICS AND TELECOMMUNICATIONS RESEARCH INSTITUTE, Daejeon (KR)

(72) Inventors: Wun Cheol Jeong, Daejeon (KR); Joon Hee Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 119 days.

(21) Appl. No.: 15/333,456

(22) Filed: Oct. 25, 2016

(65) Prior Publication Data
US 2017/0251471 A1     Aug. 31, 2017

(30) Foreign Application Priority Data

Feb. 25, 2016 (KR) .................... 10-2016-0022733

(51) Int. Cl.
*H04W 72/04* (2009.01)
*H04W 84/18* (2009.01)

(52) U.S. Cl.
CPC ..... *H04W 72/0446* (2013.01); *H04W 72/042* (2013.01); *H04W 72/0453* (2013.01); *H04W 84/18* (2013.01)

(58) Field of Classification Search
CPC ........... H04W 72/042; H04W 72/0446; H04W 72/0453; H04W 84/18
See application file for complete search history.

(56) References Cited

U.S. PATENT DOCUMENTS 6,198,728 B1 * 3/2001 Hulyalkar .......... H04Q 11/0478
370/310.1
7,020,501 B1 * 3/2006 Elliott ............... H04W 52/0216
455/574

(Continued)

FOREIGN PATENT DOCUMENTS

KR    10-2008-0059963 A    7/2008
KR    10-2012-0077525 A    7/2012

OTHER PUBLICATIONS

Wun Cheol Jeong et al., "Multi-Channel TDMA Link Scheduling for Wireless Multi-hop Sensor Networks", ICTC 2015 Final Program, Oct. 28, 2015.

*Primary Examiner* — Dung B Huynh
(74) *Attorney, Agent, or Firm* — LRK Patent Law Firm

(57) ABSTRACT

A method of allocating resources in a multi-hop wireless sensor network includes (A) when two arbitrary adjacent links among links connecting all nodes have a violation relationship where the two arbitrary adjacent links occupy the same time slot, by a network coordinator node, allocating different time slots to the two arbitrary adjacent links according to a resource allocation request command message from each of nodes configuring the multi-hop wireless sensor network, (B) when two arbitrary links which are not adjacent to each other among the links are within a communication distance, by the network coordinator node, allocating different frequency channels to the two arbitrary links, and (C) when resource allocation for all of the links is completed according to steps (A) and (B), checking whether an end-to-end maximum allowable time required by each of paths established by the links is satisfied.

15 Claims, 11 Drawing Sheets

(56) References Cited

U.S. PATENT DOCUMENTS

| | | | |
|---|---|---|---|
| 8,149,733 B2* | 4/2012 | Basu | G01D 9/005 370/230 |
| 2004/0100929 A1* | 5/2004 | Garcia-Luna-Aceves | H04W 72/1278 370/338 |
| 2004/0202121 A1* | 10/2004 | Yuang | H04L 12/5601 370/329 |
| 2005/0058151 A1* | 3/2005 | Yeh | H04W 52/46 370/445 |
| 2007/0104223 A1* | 5/2007 | Lee | H04W 72/042 370/470 |
| 2008/0137620 A1* | 6/2008 | Wang | H04W 72/0446 370/337 |
| 2008/0151821 A1 | 6/2008 | Cho et al. | |
| 2008/0165761 A1* | 7/2008 | Goppner | H04B 7/269 370/350 |
| 2009/0190542 A1* | 7/2009 | Akiyama | H04W 56/002 370/329 |
| 2009/0268674 A1* | 10/2009 | Liu | H04W 72/02 370/329 |
| 2009/0310571 A1* | 12/2009 | Matischek | H04W 72/0406 370/336 |
| 2010/0008287 A1* | 1/2010 | Lin | H04B 7/022 370/315 |
| 2010/0034159 A1* | 2/2010 | Shin | H04W 72/1257 370/329 |
| 2010/0272090 A1* | 10/2010 | Liu | H04L 27/233 370/343 |
| 2011/0013601 A1* | 1/2011 | Cerasa | H04W 28/26 370/336 |
| 2011/0149958 A1 | 6/2011 | Jeon et al. | |
| 2012/0026989 A1* | 2/2012 | Barghi | H04L 1/0668 370/336 |
| 2012/0178486 A1* | 7/2012 | Kaufmann | H04W 84/20 455/515 |
| 2013/0250928 A1* | 9/2013 | Choi | H04W 72/0446 370/337 |
| 2014/0307605 A1 | 10/2014 | Noh et al. | |
| 2015/0117257 A1* | 4/2015 | Yi | H04L 1/00 370/254 |
| 2015/0341739 A1* | 11/2015 | Jin | H04W 40/32 370/254 |
| 2016/0135242 A1* | 5/2016 | Hampel | H04W 40/02 370/329 |
| 2017/0063713 A1* | 3/2017 | Lida | H04L 47/805 |
| 2018/0034666 A1* | 2/2018 | Sung | H04L 12/4641 |

\* cited by examiner

FIG. 3

| Bytes: 1 | 2 | 2 | 2 | 1 | 2 | 1 | Variable | Variable |
|---|---|---|---|---|---|---|---|---|
| HDR CTRL | Dst Addr | Src Addr | Sequence Number | Number of Slot | Max Delay | Number of Node | Node addr[0] ... | *Node addr[x] |
| MHR | | | | | | | Payload | |

FIG. 4

| Bytes: 1 | 2 | 2 | 2 | 1 | 1 | 1 | Variable | Variable |
|---|---|---|---|---|---|---|---|---|
| HDR CTRL | Dst Addr | Src Addr | Sequence Number | Traffic ID | Number of Slots | Number of Node | SlotAllocInfo [0] | ... SlotAllocInfo [x] |
| MHR | | | | Payload | | | | |

FIG. 5

| Bytes:2 | 2 | 2 | 1 | 2 | 2 | 2 | 1 | 2 |
|---|---|---|---|---|---|---|---|---|
| | Rx Info | | | | Tx Info | | | |
| Node Addr | Node Addr | Superframe ID | Slot ID | Channel Number | Node Addr | Superframe ID | Slot ID | Channel Number |

FIG. 6
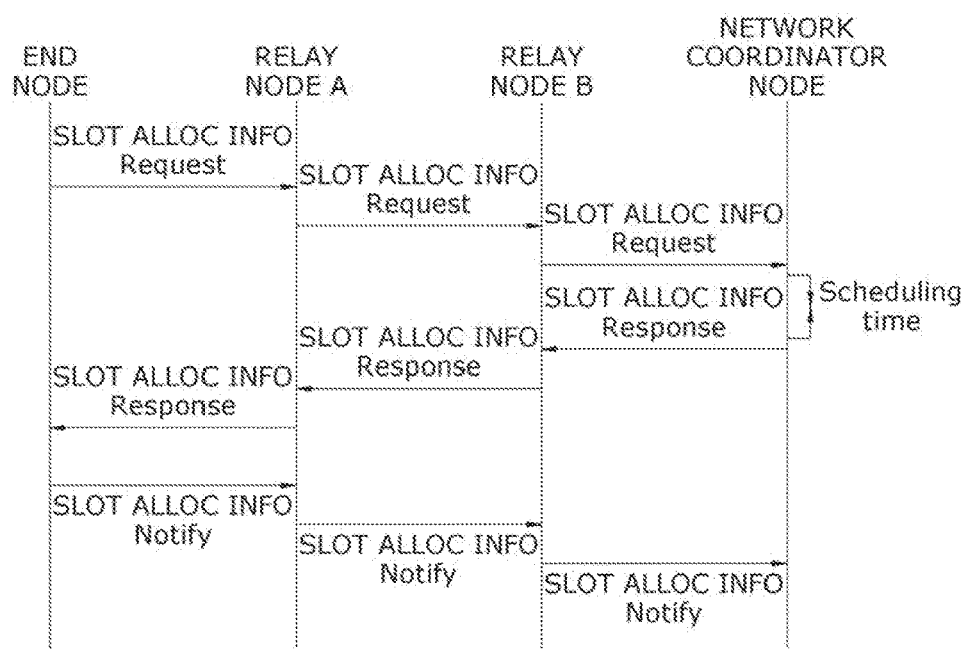
FIG. 7
FIG. 8
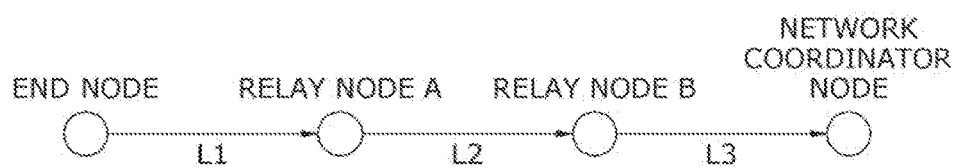

FIG. 12

|   | 1  | 2  | 3  | 4  | 5  |
|---|----|----|----|----|----|
| 1 | e1 | e2 | e8 | e6 | e9 |
| 2 | e4 | e5 | e3 |    |    |
| 3 | e7 |    |    |    |    |

FREQUENCY CHANNEL

TIME SLOT

FIG. 13

|   | 1  | 2  | 3  | 4  | 5  |
|---|----|----|----|----|----|
| 1 | e1 | e2 | e7 | e6 | e9 |
| 2 | e4 | e5 | e3 | e8 |    |
| 3 |    |    |    |    |    |

FREQUENCY CHANNEL

TIME SLOT

NODE DEVICE AND METHOD OF ALLOCATING RESOURCES IN WIRELESS SENSOR NETWORKS

CROSS-REFERENCE TO RELATED APPLICATIONS

This application claims priority under 35 U.S.C. § 119 to Korean Patent Application No. 10-2016-0022733, filed on Feb. 25, 2016, the disclosure of which is incorporated herein by reference in its entirety.

BACKGROUND OF THE INVENTION

1. Field of the Invention

The present invention relates to a method of allocating resources in wireless sensor networks, and more particularly, to a resource allocation method and a node device for end-to-end low-latency packet delivery in multi-hop wireless sensor networks.

2. Description of Related Art

Wireless sensor networks configure a network between communication devices (or sensor nodes) equipped with sensors and denote short-distance communication technology that wirelessly transmits/receives sensor data.

The sensor nodes provided in the wireless sensor networks may each be used as a battery power source. In a sensor node used as the battery power source, power available for transmission is limited, and for this reason, a transmission distance is limited.

In order to such a limitation, a multi-hop relay method where a relay node is disposed between a transmission node and a reception node to transmit obtained data in a multi-hop type has been proposed.

In a wireless sensor network based on multi-hop relay, since a number of nodes share one communication medium, it is required to perform control in order for collisions not to occur while the nodes access the communication medium. Such control technology is referred to as medium access control (MAC) technology.

In multi-channel time division multiple access (MC-TDMA) known as the MAC technology, a communication medium is divided into a time slot and a frequency channel, each node accesses the communication medium that includes a time slot and a frequency channel allocated thereto, thereby providing a wireless sensor network that enables low-power data communication to be performed at low cost and with high reliability.

Since a time slot resource is allocated for avoiding interference with a contention node, the TDMA is suitable for the application field requiring real-time transmission. Furthermore, multi-channel access increases reliability of a wireless period and maximizes the use of a bandwidth, and thus, interest in the MC-TDMA where the multi-channel access and the TDMA are combined is further increasing.

A wireless sensor network based on the MC-TDMA requires a resource allocation method that efficiently schedules communication resources such as a time slot and a frequency channel so as to satisfy requirement performance based on an application service.

Recently, the usability of a wireless sensor network is increasing in industrial sites requiring high reliability, low latency, etc. like factory automation, environment monitoring, etc. Particularly, in such an application service, a time which is taken in transferring sensor information from a node transmitting the sensor information to a last end node collecting the sensor information should not be longer than the maximum data transmission latency time which is allowable.

Nevertheless, in a related art resource allocation method based on wireless sensor network technology, resource allocation scheduling which preferentially considers enhancement of low-power operation performance is attracting more attention than resource a location scheduling based on an end-to-end data transmission latency time.

SUMMARY

Accordingly, the present invention provides a resource allocation method and a node device based on an end-to-end data transmission latency time in wireless sensor networks.

In one general aspect, a method of allocating resources in a wireless sensor network includes: (A) when two arbitrary adjacent links among links connecting all nodes have a violation relationship where the two arbitrary adjacent links occupy the same time slot, by a network coordinator node, allocating different time slots to the two arbitrary adjacent links according to a resource allocation request command message from each of nodes configuring the multi-hop wireless sensor network; (B) when two arbitrary links which are not adjacent to each other among the links are within a communication distance, by the network coordinator node, allocating different frequency channels to the two arbitrary links; and (C) when resource allocation for all of the links is completed according to steps (A) and (B), checking whether an end-to-end maximum allowable time required by each of paths established by the links is satisfied, wherein resources are allocated to each of the links according to a resource allocation schedule including steps (A) to (C).

In another general aspect, a node device, which allocates resources to each of links connecting child nodes according to a resource allocation request command message from each of the child nodes configuring a multi-hop wireless sensor network, includes: a system bus; a memory configured to store a resource allocation algorithm for allocating the resources to each of the links; and a processor configured to execute the resource allocation algorithm, stored in the memory, through the system bus, wherein when two arbitrary adjacent links among the links connecting the child nodes have a violation relationship where the two arbitrary adjacent links occupy the same time slot, the processor allocates different time slots to the two arbitrary adjacent links according to the resource allocation request command message, when two arbitrary links which are not adjacent to each other among the links are within a communication distance, the processor allocates different frequency channels to the two arbitrary links, and when resource allocation for all of the links is completed, the processor allocates the resources to each of the links according to a resource allocation schedule which checks whether an end-to-end maximum allowable time required by each of paths established by the links is satisfied.

Other features and aspects will be apparent from the following detailed description, the drawings, and the claims.

BRIEF DESCRIPTION OF THE DRAWINGS

FIG. 3 is a diagram illustrating a frame structure of a resource allocation request command message according to an embodiment of the present invention.

FIG. 4 is a diagram illustrating a frame structure of a resource allocation response command message according to an embodiment of the present invention.

FIG. 5 is a diagram illustrating a frame structure of each of a plurality of fields included in SlotAllocInfo [ ] field illustrated in FIG. 4.

FIG. 6 is a diagram illustrating a frame structure of a resource allocation notification command message according to an embodiment of the present invention.

FIG. 7 is a flowchart illustrating a flow of a command message exchanged between an end node, a relay node, and a network coordinator node according to a resource allocation message exchange protocol according to an embodiment of the present invention.

FIG. 8 is a diagram for describing a transmission sequence based on a rank in a communication path of a wireless sensor network according to an embodiment of the present invention.

FIG. 12 is a diagram illustrating a resource allocation result based on a resource allocation process illustrated in FIG. 10A.

FIG. 13 is a diagram illustrating a resource allocation result based on a resource allocation process illustrated in FIGS. 10A and 10B.

DETAILED DESCRIPTION OF EMBODIMENTS

Figure 1:
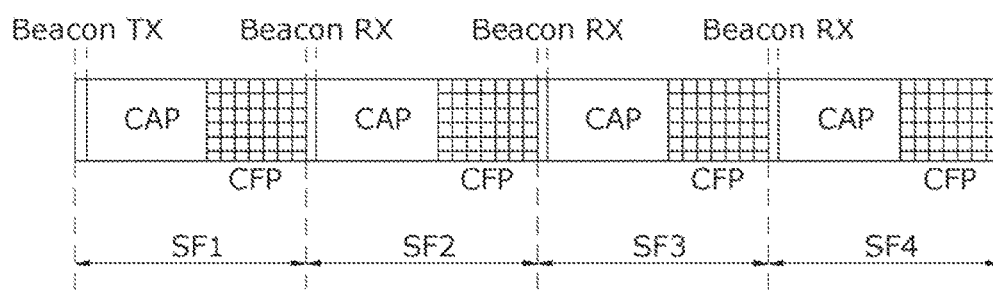
FIG. 1 is a diagram illustrating a structure of a multi-super-frame to which a resource allocation method according to an embodiment of the present invention is capable of being applied.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms or words used in the present specification and claims, limited to common or dictionary meaning is not to be construed terms appropriately for the best explanation of his own invention, the inventor should be interpreted based on the meanings and concepts corresponding to technical aspects of the present invention may be defined on the basis of the principle.

It should be construed that foregoing general illustrations and following detailed descriptions are exemplified and an additional explanation of claimed inventions is provided. Reference numerals are indicated in detail in preferred embodiments of the present invention, and their examples are represented in reference drawings. In every possible case, like reference numerals are used for referring to the same or similar elements in the description and drawings.

Embodiments of the present invention may be supported by at least one of an IEEE 802 system, a 3GPP system, a 3GPP LTE system, an LTE-advanced (LTE-A) system, and a 3GPP2 system which are wireless access systems. That is, steps or operations which are not described for clearly disclosing the technical spirit of the present invention in embodiments of the present invention may be supported by the documents. Also, all terms disclosed in the present specification may be explained by the standard document.

The following technology may be applied to various wireless access systems such as code division multiple access (CDMA), frequency division multiple access (TDMA), time division multiple access (TDMA), orthogonal frequency division multiple access (OFDMA), single carrier frequency division multiple access (SC-TDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as IEEE 802.11 (Wi-Fi), IEEE 802.16 (WiMAX), IEEE 802-20, or evolved UTRA (E-UTRA). Hereinafter, for clarity, an embodiment of the present invention will be described based on IEEE 802.11. However, the inventive concept is not limited thereto.

First, in order to help understand embodiments of the present invention, some technical terms will be described.

Multi-Super-Frame

FIG. 1 is a diagram illustrating a structure of a multi-super-frame to which a resource allocation method according to an embodiment of the present invention is capable of being applied.

Referring to FIG. 1, DSME MAC technology proposed by IEEE802.15.4e standard defines a multi-super-frame structure for ensuring real time and reliability of data.

The multi-super-frame structure may include a plurality of super-frames. For conciseness of the drawings, in FIG. 1, a multi-super-frame structure including four super-frames SF1 to SF4 is illustrated. However, the multi-super-frame may actually include a more number of super-frames.

Each super-frame may consist of a beacon slot for network visual synchronization, a contention access period (CAP), and a contention free period (CFP).

A sensor node may transmit a beacon in a beacon slot (Beacon TX) of a first super-frame SF1, for synchronization with other sensor nodes.

In the CAP, a command frame may be exchanged between sensor nodes through a common frequency channel by using carries sense multiple access/control access (CSMA/CA).

On the other hand, in the CFP enabling the use of a multi-frequency channel, a time slot and a frequency channel which are to be used between two sensor nodes desiring communication may be reserved, and then, a data frame may be exchanged through the time slot/frequency channel reserved therebetween.

A time slot/frequency channel resource may be reserved by exchanging a resource allocation command frame between sensor nodes desiring communication in the CAP.

3-Way Handshake

In a distributed network, 3-way handshake technology may be used for resource allocation.

Figure 2:
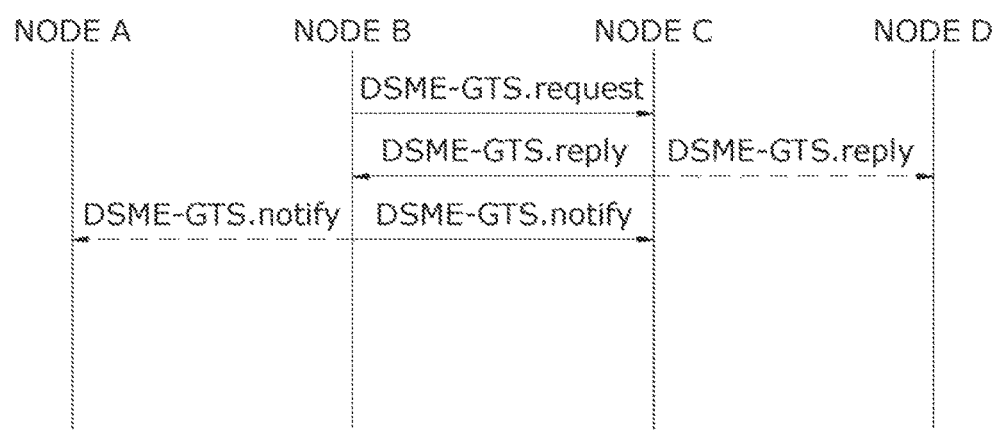
FIG. 2 is a flowchart illustrating message flow for 3-way handshake used for resource allocation in deterministic and synchronous multi-channel extension (DSME) MAC technology according to an embodiment of the present invention.

FIG. 2 is a flowchart illustrating message flow for 3-way handshake used for resource allocation in deterministic and synchronous multi-channel extension (DSME) MAC technology according to an embodiment of the present invention.

Referring to FIG. 2, a sensor node (a node B) which desires resource allocation may transmit a resource allocation request command frame (DSME-GTS.request) to a parent node (a node C).

A sensor node (the node C) which has received the resource allocation request command frame (DSME-GTS.request) may check allocable resources, and then, may transmit a resource allocation response command frame (DSME-GTS.reply or DSME-GTS.response) including resource allocation information to a sensor node (the node B) which has transmitted the resource allocation request command frame (DSME-GTS.request). At this time, the sensor node (the node C) may notify adjacent sensor nodes (the node B and the node C) of updated resource allocation information by broadcasting a response command frame. When the sensor node (the node B) which has requested resource allocation receives the response command frame successfully, the sensor node (the node B) may broadcast a resource allocation notification command frame (DSME-GTS.notify) to the adjacent sensor nodes (the node B and the node C), thereby completing resource allocation for a corresponding link.

In a resource allocation method based on the 3-way handshake technology, an overhead is large. Also, since a distributed resource allocation method is used, a network coordinator node cannot minimize end-to-end data transmission latency or optimize efficiency of communication resources.

Channel Diversity

In the CFP of the multi-super-frame structure, reliability of data transmission is secured through channel diversity. Examples of a channel diversity method proposed in the standard document may include a channel hopping method and a channel adaptation method.

The channel hopping method may be a method that transmits data by changing a frequency channel at every time slot, based on a certain rule. The channel adaptation method may be a method that transmits/receives data by using only a pre-allocated time slot and frequency channel.

The channel diversity may be technology that allocates resources so as not to overlap a resource allocated by an adjacent link, and thus, prevents a collision from occurring in transmitting data, thereby using a merit of a multi-channel.

However, a wireless sensor network consisting of a multi-hop needs resource allocation technology based on an end-to-end data transmission latency time, in addition to resource allocation for simply avoiding a collision.

Traffic-Based Resource Allocation Method

The traffic-based resource allocation method may be a resource allocation method that reduces packets concentrated on a specific node in wireless sensor networks, thereby enhancing transmission efficiency. The traffic-based resource allocation method may be a method that, when a multi-path overlaps a specific node, preferentially allocates communication resources to a node which is high in transmission demand, thereby minimizing bottleneck. However, such technology cannot ensure low latency of end-to-end data transmission.

Multi-Hop Resource Reservation Method for Reducing Overheads

In the above-described 3-way handshake, transmission/reception of three kinds of command frames between two nodes is need for resource allocation. For example, if a scale of a network increases, an overhead which occurs for resource allocation increases massively.

In terms of reducing overheads, the multi-hop resource reservation method may not be a method of performing resource allocation by a link unit (between two neighboring nodes) but may be a method of performing resource allocation by a routing path unit.

Each of nodes of a communication path may transmit a resource allocation request to its own parent node, and the parent node which has received the resource allocation request may deliver resource allocation request about its own child node and resource allocation request information about the parent node to its own parent node.

Such a process may be repeated until the network coordinator node receives the resource allocation request command, and then, resource allocation information may be delivered through child nodes in a reverse sequence of the sequence of nodes which have undergone a process where the network coordinator node allocates resources to receive a resource allocation request. Such a method uses two kinds of command frames for a request and a response instead of three kinds of frames which are generated in distributed resource allocation based on the 3-way handshake method, and thus, the number of command frames is reduced. That is, such resource allocation is performed by a path unit instead of a link unit, and thus, overheads caused by resource allocation are reduced.

However, such technology is for decreasing overheads in a resource allocation process, and for this reason, it is difficult to obtain an effect where network efficiency of data transmission/reception is enhanced by optimizing resource allocation of nodes existing in networks.

According to an embodiment of the present invention, low-power performance of relay nodes is maximized in multi-hop wireless sensor networks, and sensor information (data or sensor data) may be delivered within an end-to-end maximum transmission latency time allowed by an application service in all communication paths existing in the wireless sensor networks.

To this end, the resource allocation method according to an embodiment of the present invention may use a centralized resource allocation method instead of the above-described distributed resource allocation method. That is, all nodes in the wireless sensor networks may deliver their resource allocation request commands to the network coordinator node, and the network coordinator node which have received the resource allocation request commands may generate a resource allocation schedule that satisfies the purpose of delivering sensor information within an allowed end-to-end maximum transmission latency time, and may respond to nodes which have transmitted a resource location command message.

End-to-end resource allocation may have a close relationship with a configuration of a communication path. In an embodiment of the present invention, it is assumed that nodes of the wireless sensor networks previously obtain their communication paths before performing a resource allocation process. The communication paths may be secured in a process where each of the nodes joins a network. For example, in joining a network, since each node determines its own parent node, a communication path to the network coordinator node may be secured.

The resource allocation method according to an embodiment of the present invention may use a method (or an algorithm) that generates a resource allocation schedule and a resource allocation message exchange protocol for exchanging a resource allocation request message and a response message including a schedule on the resource allocation request message.

First, the resource allocation message exchange protocol applied to the resource allocation method according to an embodiment of the present invention will be described in detail, and then, a method of generating a resource allocation schedule based on the resource allocation message exchange protocol will be described in detail.

Resource Allocation Message Exchange Protocol

The resource allocation message exchange protocol for resource allocation according to an embodiment of the present invention may include a resource allocation request command message (SLOT ALLOC INFO Request), a resource allocation response command message (SLOT ALLOC INFO Response), and a resource allocation notification command message (SLOT ALLOC Notify).

The command messages may be inserted into a data frame of an MAC sub-layer and may be exchanged in a wireless period. Here, the MAC sub-layer may be a layer configuring a data link layer in an open system interconnection (OSI) layer model and may configure a packet, delivered from an upper layer, in a frame format of a physical network.

The resource allocation request command message (SLOT ALLOC INFO Request) and the resource allocation response command message (SLOT ALLOC INFO Response) may be exchanged through a common frequency channel in the CAP of FIG. 1, and the resource allocation notification command message (SLOT ALLOC Notify) may be exchanged through communication resources (a time slot and a frequency channel) allocated in the CAP of FIG. 1.

Resource Allocation Request Command Message (SLOT ALLOC INFO Request)

FIG. 3 is a diagram illustrating a frame structure of a resource allocation request command message according to an embodiment of the present invention.

Referring to FIG. 3, the resource allocation request command message (SLOT ALLOC INFO Request) may be a message which is generated by a sensor node to which sensor information (data or sensor data) is to be transmitted, and is delivered to the network coordinator node via a relay node.

The resource allocation request command message (SLOT ALLOC INFO Request) may include an MAC header field (MHR) and a payload.

The MAC header field (MHR) may include an HDR CTRL field, a Dst Addr field, an Src Addr field, and a Sequence Number field.

The HDR CTRL field may include information indicating the kind of a command message, a request traffic direction, etc. The information indicating the request traffic direction may include information indicating whether a transmission direction of data passing through a communication path is a network traffic direction (uplink) or an end sensor node direction (downlink).

The Dst Addr field may include arrival address information. Here, the arrival address information may include an address of the network coordinator node.

The Src Addr field may include start address information. Here, the start address may include an address of a sensor node (hereinafter referred to as an initial sensor node) that initially transmits the resource allocation request command message (SLOT ALLOC INFO Request).

The Sequence Number field may include a current value of a macDSN.

The initial sensor node may transmit the resource allocation request command message (SLOT ALLOC INFO Request) to its own parent node on a communication path, and the parent node may check the Dst Addr field of the received resource allocation request command message (SLOT ALLOC INFO Request) to determine whether an arrival address is an address of the parent node. When it is determined that the arrival address is not the address of the parent node, the parent node may relay the resource allocation request command message (SLOT ALLOC INFO Request) to its own parent node.

The payload field may include a Number of Slot field, a Max Delay field, a Number of Node field, and a Node addr[0-x] field.

The number of communication resources (the number of requested time slots) which is to be allocated may be recorded in the Number of Slot field. Here, the number of communication resources may include the number of the requested time slots.

An allowed end-to-end maximum transmission latency time value may be recorded in the Max Delay field. A value associated with the number of nodes existing on a corresponding communication path may be recorded in the Number of Node field. The Node adds[ ] field may include information associated with a node address. The Node addr[ ] field may include a plurality of fields (Node addr[0] to Node addr[x]), and an address value of each node may be recorded in each of the fields.

A relay node which has received the resource allocation request command message (SLOT ALLOC INFO Request) may increase a value, recorded in the Number of Node field included in the payload, by one and may add its address information into the Node addr[x] field, which is a last field in the Node addr[x] field, to relay the Node addr[x] field to its own parent node.

In the resource allocation request command message (SLOT ALLOC INFO Request), a Node addr[r] field (0<r<x) may increase whenever passing through a relay node, and thus, when a relay node existing on a communication path may increase, a size of a message may increase. Also, the resource allocation request command message (SLOT ALLOC INFO Request) may start at an end sensor node on the communication path, and thus, when the number of network communication paths increases, the number of messages may increase.

Resource Allocation Response Command Message (SLOT ALLOC INFO Response)

When all resource allocation request command messages (SLOT ALLOC INFO Request) received from all end nodes are successfully received, the network coordinator node may generate a resource allocation schedule on each node by using information included in each of the resource allocation request command messages (SLOT ALLOC INFO Request).

When the network coordinator node completes the generation of the resource allocation schedule, the network coordinator node may transmit the resource allocation response command message (SLOT ALLOC INFO Response), including resource allocation schedule information about each of nodes existing on communication paths, to an end node on each of the communication paths. Here, the resource allocation schedule information may include a time slot, a frequency channel number, etc.

Likewise with the above-described resource allocation request command message (SLOT ALLOC INFO Request), the resource allocation response command message (SLOT ALLOC INFO Response) may be transmitted to an end node via a relay node.

A frame structure of the resource allocation response command message (SLOT ALLOC INFO Response) is illustrated in FIG. 4.

Referring to FIG. 4, the resource allocation response command message (SLOT ALLOC INFO Response) may include an MAC header (MHR) and a payload.

The MAC header (MHR) may include a Dst Addr field, an Src Addr field, and a Sequence Number field. An arrival address may be recorded in the Dst Addr field. Here, the arrival address may be an address value of each of end nodes. A start address may be recorded in the Src Addr field. Here, the start address may include an address value of the network coordinator node that initially transmits the resource allocation response command message (SLOT ALLOC INFO Response). The Sequence Number field may include a current value of a macDSN.

The payload field may include a Traffic ID field, a Number of Slots field, a Number of Node field, and a SlotAllocInfo[ ] field.

The SlotAllocInfo[ ] field may include a plurality of fields (SlotAllocInfo[0] to SlotAllocInfo[x]) which are sorted (arranged or listed) in a list type. Resource allocation schedule information about nodes included in a corresponding path may be recorded in each of the fields.

The plurality of fields (SlotAllocInfo[0] to SlotAllocInfo[x]) included in the SlotAllocInfo[ ] field may be sorted (arranged or listed) in the sequence of nodes which are located in a direction from an end node, existing on a corresponding communication path, to the network coordinator node.

For example, resource allocation schedule information about an end sensor node may be recorded in the SlotAllocInfo[0] field, and resource allocation schedule information about a parent node of the end sensor node may be recorded in the SlotAllocInfo[1] field.

FIG. 5 is a diagram illustrating a frame structure of each of the plurality of fields included in the SlotAllocInfo [ ] field illustrated in FIG. 4.

Referring to FIG. 5, each of the fields included in the SlotAllocInfo [ ] field may include a first subfield (Rx info), including resource allocation schedule information which is to be received by a resource-allocated node, and a second subfield (Tx Info) including resource allocation schedule information which is to be transmitted by the resource-allocated node.

The first subfield (Rx Info) may include a Node Addr field including an address of a node which is to be transmitted, a field including time slot information used by the node which is to be transmitted, and a Channel Number field including frequency channel information. Here, the field including the time slot information may include a field including a super-frame identification (ID), used by the node which is to be transmitted, and a field including a slot ID used by the node which is to be transmitted.

The second subfield (Tx Info) may include a Node Addr field including an address of a node which is to be received, a field including time slot information used by the node which is to be received, and a Channel Number field including frequency channel information. Here, the field including the time slot information may include a field including a super-frame identification (ID), used by the node which is to be received, and a field including a slot ID used by the node which is to be received.

In a process of transmitting the resource allocation response command message (SLOT ALLOC INFO Response) to an end node, relay nodes which have received the resource allocation response command message (SLOT ALLOC INFO Response) may extract a frequency channel number and a time slot (a super-frame ID and a slot ID) included in their resource allocation schedule information from the resource allocation response command message (SLOT ALLOC INFO Response) and may decrease a value, recorded in the Number of Node field, by one to relay the decreased value to its own child node.

The extracted resource allocation schedule information may be allocated as a communication resource for later transmission/reception of sensor data (or sensor information).

The resource allocation request command message (SLOT ALLOC INFO Request) may be delivered in an uplink direction (a direction toward the network coordinator node). Most of the wireless sensor networks may have a tree-type network topology form where a link converges in the direction toward the network coordinator node. In this case, in a process of transmitting data in the uplink direction, each of the relay nodes may relay a received message to its own parent node.

However, in a process of transmitting a message in a downlink direction like the resource allocation response command message (SLOT ALLOC INFO Response), in order for the resource allocation response command message (SLOT ALLOC INFO Response) to be delivered to a last reception node, an appropriate child node existing on a communication path should be selected from among a plurality of child nodes connected to a relay node.

Information included in the resource allocation request command message (SLOT ALLOC INFO Request) which a relay node has received from a child node may be used for selecting an appropriate child node. That is, whenever the resource allocation request command message (SLOT ALLOC INFO Request) is received, the relay node may obtain address information about a sensor node which has generated the resource allocation request command message (SLOT ALLOC INFO Request), based on a value recorded in the Src Addr field of the resource allocation request command message (SLOT ALLOC INFO Request) and an address of a child node which has transmitted the resource allocation request command message (SLOT ALLOC INFO Request), may differentiate a communication path through which the relay node passes, based on the obtained address information, and may previously store child node information about the communication path.

Subsequently, when the relay node receives the resource allocation response command message (SLOT ALLOC INFO Response), the relay node may differentiate a communication path by using the Src Addr field value of the resource allocation response command message (SLOT ALLOC INFO Response) and may select its own child node existing on the communication path.

Resource Allocation Notification Command Message (SLOT ALLOC Notify)

When an end node successfully receives the resource allocation response command message (SLOT ALLOC INFO Response), the end node may transmit the resource allocation notification command message (SLOT ALLOC Notify) to the network coordinator node to notify the network coordinator node that requested resource allocation is completed.

A node which has requested resource allocation may receive the resource allocation response command message (SLOT ALLOC INFO Response) to check a response of the network coordinator node to a request, thereby reserving an allocated resource. However, the network coordinator node which has received a resource allocation request cannot check whether the resource allocation response command message (SLOT ALLOC INFO Response) transmitted by the network coordinator node is delivered to an end node well. The network coordinator node may receive the resource allocation notification command message (SLOT ALLOC Notify) to check that resource reservation of all nodes on a corresponding communication path is completed.

Nodes on a communication path may receive the resource allocation response command message (SLOT ALLOC INFO Response), and since a scheduled communication resource has been allocated by the network coordinator node, the resource allocation notification command message (SLOT ALLOC Notify) may be relayed to the network coordinator node by using communication resources allocated in the CAP of FIG. 1.

Therefore, the network coordinator node may receive the resource allocation notification command message (SLOT ALLOC Notify) to check that the nodes on the communication path have received the resource allocation response command message (SLOT ALLOC INFO Response) transmitted by the nodes, and may check that the allocated communication resources are activated without a collision therebetween.

A frame structure of the resource allocation notification command message is illustrated in FIG. 6.

As illustrated in FIG. 6, the resource allocation notification command message (SLOT ALLOC Notify) may include an HDR CTRL field, a Dst Addr field, an Src Addr field, and a Sequence Number field.

The network coordinator node may compare a value, recorded in the Sequence Number field of the resource allocation notification command message (SLOT ALLOC Notify) received, and a value recorded in the Sequence Number field of the resource allocation response command message (SLOT ALLOC INFO Response) previously transmitted, and when there is a match therebetween, the network coordinator node may check that the resource allocation response command message (SLOT ALLOC INFO Response) is delivered to an end node well.

FIG. 7 is a flowchart illustrating a flow of a command message exchanged between an end node, a relay node, and a network coordinator node according to a resource allocation message exchange protocol according to an embodiment of the present invention.

In FIG. 7, it is assumed that two relay nodes exist on a communication path between an end node and the network coordinator node, and actually, there may be a more number of relay nodes. Command messages transmitted to or received from each of nodes have been sufficiently described above with reference to FIGS. 3 to 6, and thus, their detailed descriptions are not repeated. However, in FIG. 7, "Scheduling time" may denote a time taken in a resource allocation scheduling process performed by the network coordinator node.

Hereinafter, a method (a communication allocation algorithm) where the network coordinator node generates a resource allocation schedule by using the resource allocation message exchange protocol described above with reference to FIGS. 3 to 7 will be described below in detail.

Resource Allocation Schedule (Communication Resource Allocation Schedule)

When the network coordinator node successfully receives the resource allocation request command messages (SLOT ALLOC INFO Request) from all end nodes that generate sensor data in wireless sensor networks, a resource allocation scheduling process for allocating communication resources may start.

In other words, the network coordinator node may complete collection of the resource allocation request command messages from all nodes on a communication path, and then, a process of scheduling communication resources (a time slot and a frequency channel) for satisfying quality (a maximum allowable transmission latency time and a communication capacity defined as the number of time slots) required by each node may be performed.

First, in a process of scheduling communication resources, a collision relationship between links may be considered. Here, the collision relationship may denote a state where two arbitrary links are within a communication distance, and when packets are transmitted by using the same resource, a collision between the packets occurs in a reception node.

Therefore, when performing resource allocation, the network coordinator node should schedule communication resources in order for a packet collision not to occur in a reception node, based on a collision relationship.

In a method (or a resource allocation method) of scheduling resource allocation according to an embodiment of the present invention, in a case where the same time slot is allocated to two arbitrary links located within a two-hop distance in wireless sensor networks, the network coordinator node may allocate different frequency channels to the two arbitrary links in order for a packet collision not to occur in a reception node.

However, in a case where the two links share the same node, packets cannot be transmitted to or received from a plurality of nodes due to characteristic of sensor nodes using a half-duplex communication scheme, and thus, the network coordinator node may allocate different time slots to two links, for communication.

A resource allocation collision caused by the half-duplex communication scheme occurs in two adjacent links having a common node. In order to show such characteristic, in a process of scheduling resource allocation according to an embodiment of the present invention, the two adjacent links including the common node may be referred to as a collision adjacency link.

The method of scheduling resource allocation according to an embodiment of the present invention may establish a transmission sequence based on a rank, for shortening an end-to-end transmission latency time in a multi-hop wireless sensor network environment. Here, the rank may denote a sequence of each hop with respect to a node which transmits sensor data through a predetermined communication path.

For example, as illustrated in FIG. 8, when a wireless sensor network where two relay nodes exist on a communication path connecting an end node to the network coordinator node is assumed, an end node may generate sensor information (or sensor data), and the generated sensor information may be finally delivered to the network coordinator node via a relay node A and a relay node B. In this case, a link L1 that connects the end node to the relay node A corresponding to a parent node of the end node may be set to a rank 1 (or a rank value is set to 1), and a link L2 that connects the relay node A to the relay node B corresponding to a parent node of the relay node A may be set to a rank 2 (or a rank value is set to 2). Also, a link L3 that connects the relay node B to the network coordinator node may be set to a rank 3 (or a rank value is set to 3).

In a case of setting a transmission sequence based on the ranks, the transmission sequence may be allocated as the sequence of the rank 1, the rank 2, and the rank 3 so that a link set to the rank 1 is first activated, and subsequently, a link set to the rank 2 and a link set to the rank 3 are sequentially activated. That is, resource allocation may be performed in order for data transmission to start from a link of which a rank value is the smallest set.

For example, with no consideration of ranks, if resource allocation is performed so that data transmission starts from a link of which a rank value is large, data delivery may be first performed in the link of which the rank value is large, and for this reason, data can be transmitted after standby equal to a data frame length.

Figure 9A:
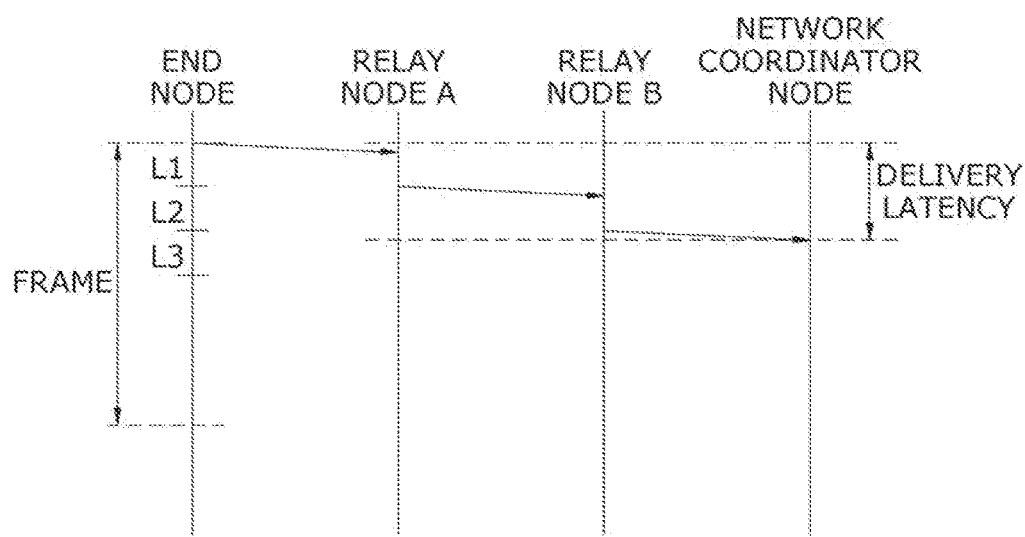
FIG. 9A is a diagram illustrating a transmission latency time in a resource allocation method based on a transmission sequence based on a rank in the wireless sensor network according to an embodiment of the present invention.
Figure 9B:
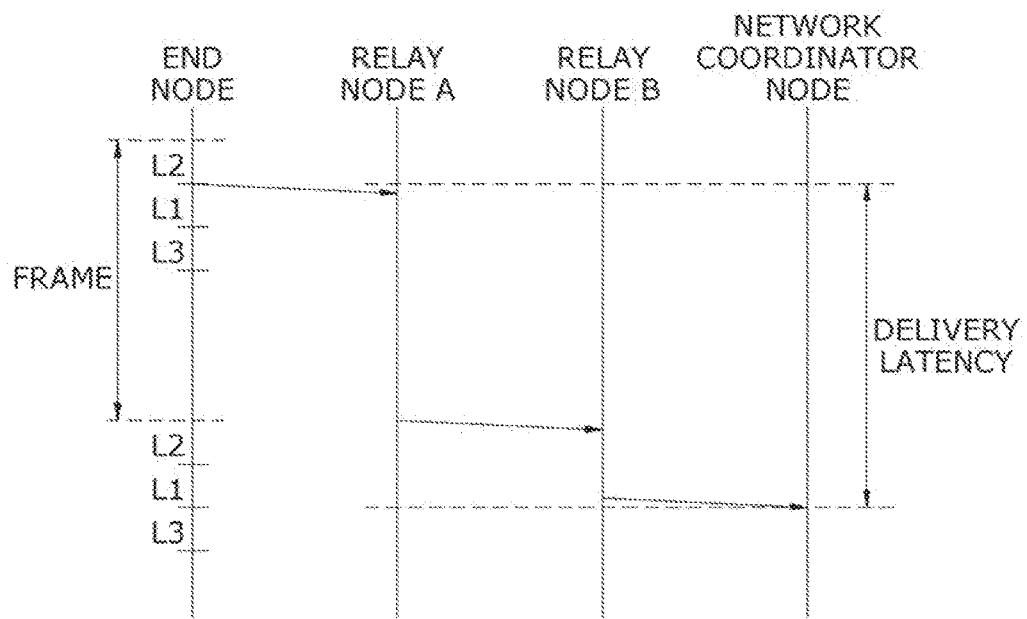
FIG. 9B is a diagram illustrating a transmission latency time in a resource allocation method with no consideration of a transmission sequence based on a rank in the wireless sensor network according to an embodiment of the present invention.

FIG. 9A is a diagram illustrating a transmission latency time in a resource allocation method based on a transmission sequence based on a rank in the wireless sensor network according to an embodiment of the present invention. FIG. 9B is a diagram illustrating a transmission latency time in a resource allocation method with no consideration of a transmission sequence based on a rank in the wireless sensor network according to an embodiment of the present invention.

As illustrated in FIG. 9B, with no consideration of a transmission sequence based on ranks, if the link 2 (L2) is earlier activated than the link 1 (L1), a standby time equal to a length of a data frame which is transmitted from an end node through the link 1 (L1) occurs in the link 2 (L2).

Therefore, due to the standby time, a resource allocation method with no consideration of a transmission sequence has a transmission latency time which is longer than a resource allocation method based on a transmission sequence based on ranks illustrated in FIG. 9A.

As illustrated in FIG. 9A, when a transmission sequence based on ranks is established, a time taken in transmitting sensor data between end nodes is minimized in a corresponding communication path. Therefore, when a transmission sequence based on ranks is scheduled on all communication paths in wireless sensor networks, an end-to-end delivery time is minimized.

The resource allocation method according to an embodiment of the present invention, as described above, may determine a transmission sequence based on ranks, for minimizing an end-to-end transmission latency time.

First, a transmission sequence of links on the same communication path may be determined in ascending power of rank values which are respectively set in the links.

Resources may be allocated to links existing on different communication paths, based on a collision relationship with an adjacent link and characteristic of the half-duplex communication scheme. That is, in links existing on different communication paths, even when the same time slot and the same frequency channel are allocated, whether a resource allocation condition based on a collision relationship or characteristic of a collision adjacency link is violated may be inspected, and if the resource allocation condition is not violated, a corresponding time slot and a corresponding frequency channel may be allocated.

For example, if a resource allocation condition for allocated resources is not satisfied, different frequency channels may be allocated to links that violate the resource allocation condition, and the resource allocation condition may be again inspected. Even in this case, if the resource allocation condition is not satisfied, different time slots may be allocated to the links, and re-inspection may be performed. Such a process may be repeated until the resource allocation condition is satisfied.

Figure 10A:
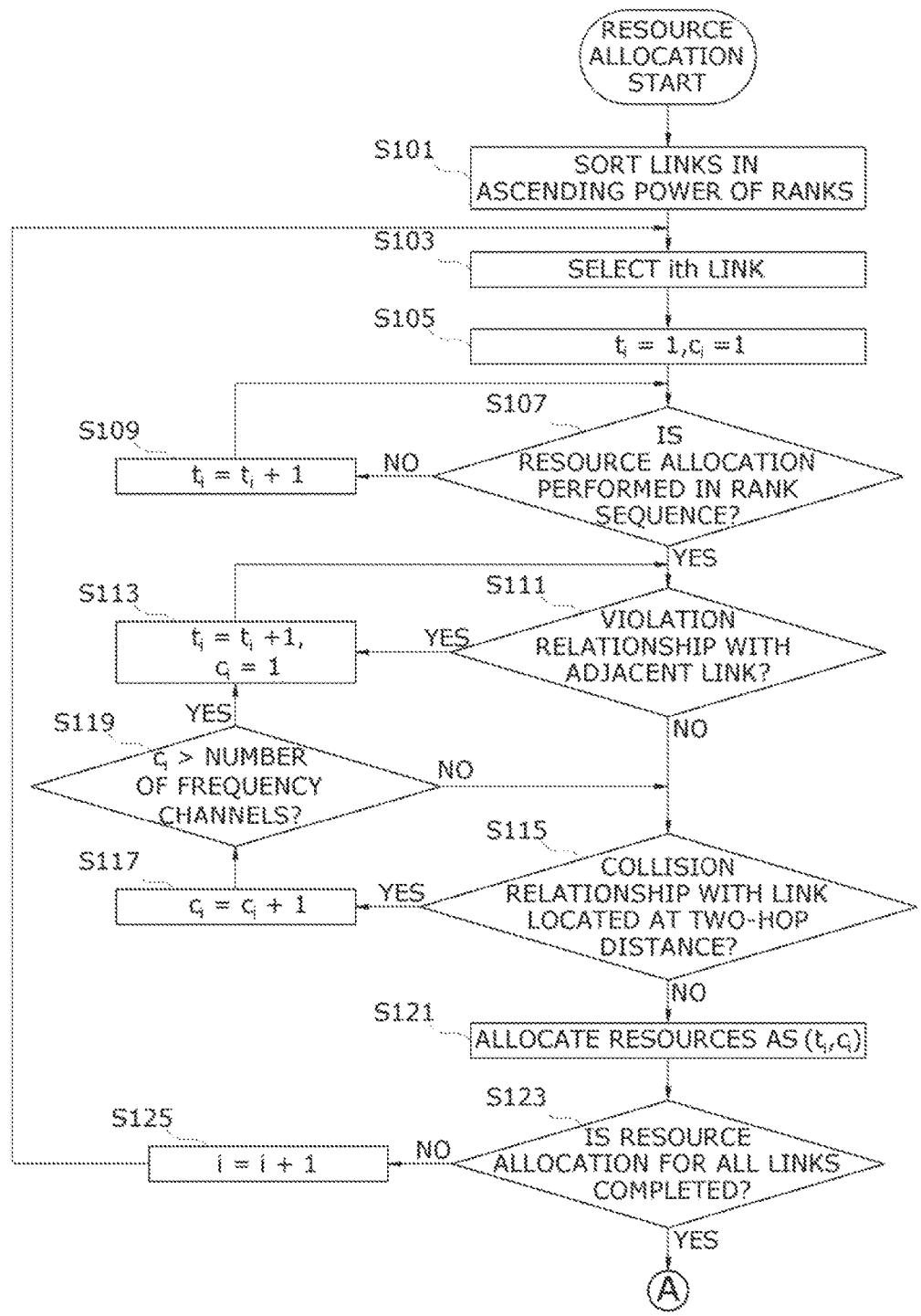
FIGS. 10A and 10B are flowcharts illustrating a resource allocation method according to an embodiment of the present invention.
Figure 10B:
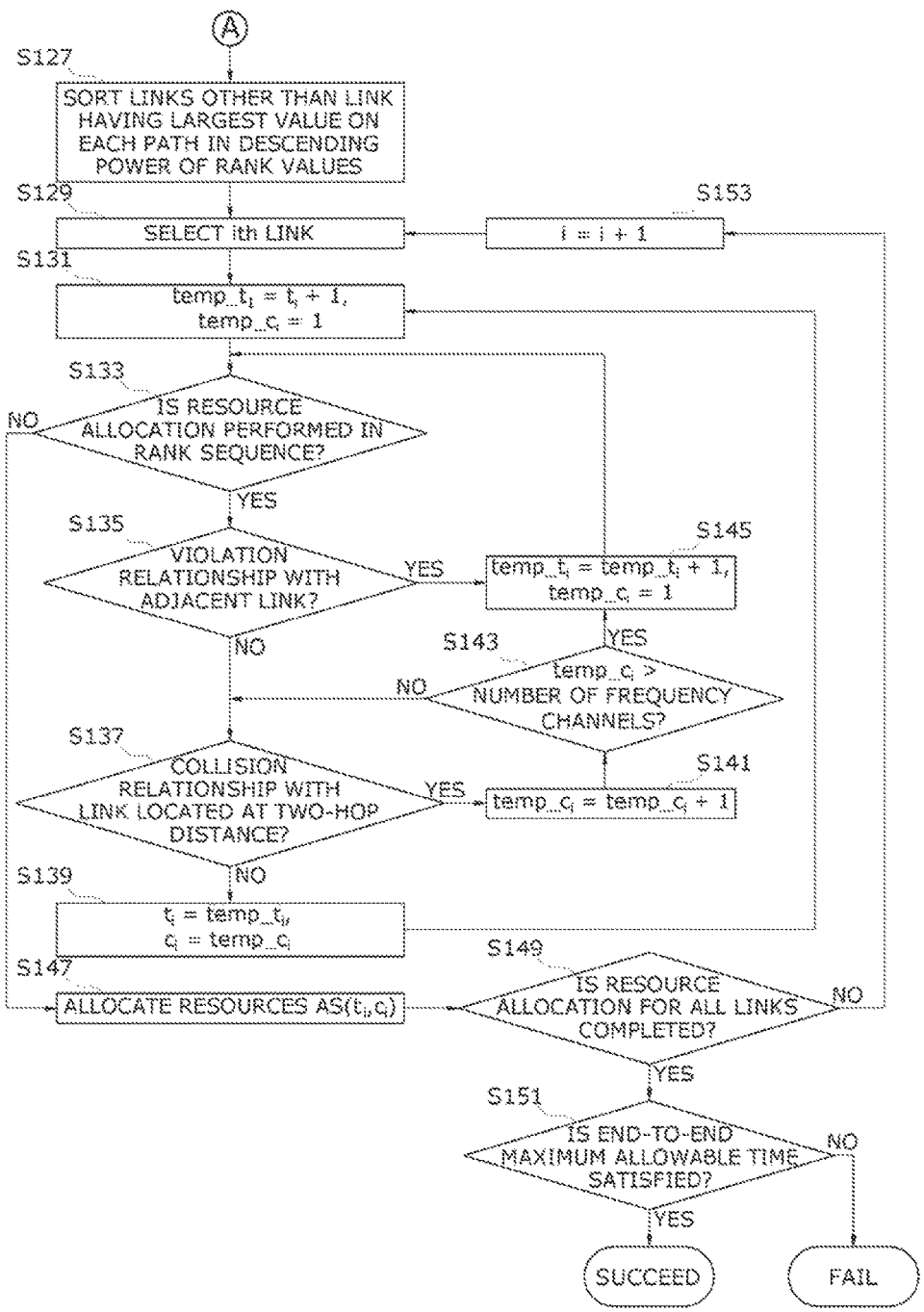
Figure 11:
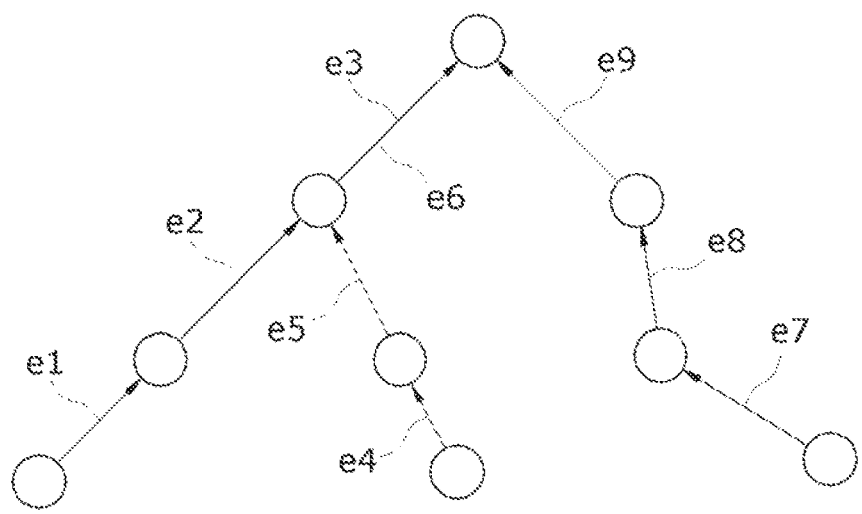
FIG. 11 is a diagram illustrating a wireless sensor network for describing the resource allocation method illustrated in FIGS. 10A and 10B.

FIGS. 10A and 10B are flowcharts illustrating a resource allocation method according to an embodiment of the present invention. FIG. 11 is a diagram illustrating a wireless sensor network for describing the resource allocation method illustrated in FIGS. 10A and 10B. FIG. 12 is a diagram illustrating a resource allocation result based on a resource allocation process illustrated in FIG. 10A.

In the flowchart of FIG. 10A, $t_i$ denotes a time slot value allocated to an ith link, and $c_i$ denotes a frequency channel value allocated to the ith link. Also, a main element for performing the following operations may be assumed as the network coordinator node unless specially described.

First, referring to FIG. 10A, in step S101, the network coordinator node may sort links existing on each of communication paths in ascending power of rank values which are respectively set to links. In this case, links having the same rank value on different communication paths may be sorted in an arbitrary sequence.

In step S103, the ith link may be selected from among the sorted links.

In step S105, each of a $t_i$ value and a $c_i$ value may be allocated as an initial value (1, 1) to the ith link.

In step S107, when a resource is allocated as the initial value (1, 1) to the ith link, the network coordinator node may check whether a resource allocation schedule condition based on a previously allocated link schedule and rank sequence is satisfied. When it is checked in step S017 that the resource allocation schedule condition is not satisfied, the network coordinator node may increase the $t_i$ value by one until the resource allocation schedule condition is satisfied in step S109.

When it is checked in step S017 that the resource allocation schedule condition is satisfied, the network coordinator node may check whether the ith link has a violation relationship with an adjacent link in step S11. Here, the adjacent link denotes a link which is located adjacent (neighboring) to the ith link. That is, a link adjacent to the ith link may share the same node with the ith link. In this case, when the ith link and the adjacent link occupy the same time slot, the violation relationship is established between the ith link and the adjacent link. That is, in a case where an arbitrary time slot is allocated to the ith link, if the adjacent link previously occupies the arbitrary time slot, the violation relationship is established between the ith link and the adjacent link.

In this manner, if the violation relationship is established between the ith link and the adjacent link, the network coordinator node may increase the $t_i$ value by one so that the violation relationship is not established between the ith link and the adjacent link in step S113. That is, the network coordinator node may move to a next time slot and may determine whether the adjacent link having the violation relationship occupies the next time slot. The network coordinator node may continuously increase the $t_i$ value until a time slot which is not occupied by the adjacent link having the violation relationship is searched for.

When a corresponding time slot is searched for, the network coordinator node may check whether the ith link has a collision relationship with an adjacent link located within a communication distance in step S115. Here, if the ith link is not adjacent (not neighboring) to the adjacent link, the ith link is spaced apart from the adjacent link by a two-hop communication distance, and the ith link and the adjacent link occupy the same resource, the collision relationship is established between the ith link and the adjacent link.

If the adjacent link having the collision relationship with the ith link is searched for, a frequency channel different from a frequency channel allocated to the adjacent link may be allocated to the ith link. That is, in step S117, the network coordinator node may increase the $c_i$ value by one so that a collision does not occur between the ith link and the adjacent link. The network coordinator node may continuously increase the $c_i$ value until a frequency channel which is not occupied by the adjacent link having the collision relationship with the ith link is searched for.

In step S119, the network coordinator node may check whether a corresponding node supports the increased $c_i$ value. That is, the network coordinator node may check whether the increased $c_i$ value is within a frequency channel range (or the number of frequency channels) supported by a transceiver of the corresponding node. If the increased $c_i$ value is not within the frequency channel range, in step S113, the network coordinator node may increase the $t_i$ value by one and may initialize the increased $c_i$ value to 1.

The network coordinator node may perform resource scheduling on the ith link until all conditions for steps S107, S111 and S115 are satisfied, and when resources are allocated as ($t_i$, $c_i$) to the ith link in step S121, the network coordinator node may check whether resource allocation is completed for all links in step S123.

If the resource allocation is not completed for all the links, the network coordinator node may increase the i value by one in step S125, and may again perform a resource allocation process, performed in steps S103 to S125, on an i+1st link.

When resource allocation for all links existing in a network is completed through steps S101 to S125, the network coordinator node may allocate resources in this sequence from a first time slot of a network frame.

A time taken from a time slot, occupied at an earliest time, to a time slot occupied at a last time in a network frame is minimized up to step S125, but minimization of an end-to-end transmission latency time cannot be ensured. The reason is because a multi-hop network consists of a multi-path instead of a single path.

Therefore, after step S123, the network coordinator node may perform a process of again searching for resources for further shortening the end-to-end transmission latency time and reallocating the found resources.

The resource reallocation process for further shortening the end-to-end transmission latency time will be described below in detail with reference to FIGS. 11 and 12.

Referring to FIG. 10B, in step S121, the network coordinator node may sort links other than a link having a largest value on each communication path in descending power of rank values which are respectively set to the links. For example, in FIG. 11, since e3, e6, and e9 are highest ranks, e3, e6, and e9 may be excluded, and links may be sorted in the sequence of {e2, e5, e8, e1, d4, and d7}.

Subsequently, in step S120, the network coordinator node may select the ith link from among the links which are sorted in descending power of the rank values. If i is 3, the ith link may be e8 among the {e2, e5, e8, e1, d4, and d7}.

Subsequently, in step S131, the network coordinator node may increase the $t_i$ value, allocated to the ith link by the resource allocation method of FIG. 10A, by one, store the increased t value in a temporary variable temp_$t_i$, set the $c_i$ value, allocated to the ith link, to an initial value "1", and store the initial value "1" in a temporary variable temp_$c_i$. For example, when the ith link is e8, and as illustrated in FIG. 12, resources including time slot No. 3 and frequency channel No. 1 are allocated to the ith link (e8) by the resource allocation method of FIG. 10A, 4 may be stored in the temporary variable temp_$t_i$, and 1 may be stored in the temporary variable temp_$c_i$.

Subsequently, in step S133, in a case where resources (temp_$t_i$, temp_$c_i$) are allocated as resources of the ith link, the network coordinator node may check whether the resources (temp_$t_i$, temp_$c_i$) which are to be allocated are allocated in a rank sequence. For example, in a case where the ith link is e8, according to the resource allocation method of FIG. 12, since the ith link (e8) is allocated at a time, which is later than a link (e7, allocation to time slot No. 1) having a rank value lower than a rank value of the ith link (e8) among links existing on the same communication path, and is allocated at a time which is earlier than a link (e9) (allocated to time slot No. 5) having a rank value higher than the rank value of the ith link (e8), the network coordinator node may determine that resources which are allocated as (4, 1) to the ith link (e8) are allocated in the rank sequence.

Subsequently, in step S135, the network coordinator node may check whether an adjacent link having a violation relationship with the ith link occupies the resources (temp_$t_i$, temp_$c_i$) allocated to the ith link. For example, in a case where the ith link is e8, in FIG. 11, two adjacent links of e8 are e7 and e9. In this case, e8 cannot be allocated a time slot which is the same as that of the two adjacent links (e7, e9). Accordingly, in a case where resources (4, 1) are allocated to e8, since time slot No. 4 is not allocated to the two adjacent links (e7, e9) in FIG. 12, the violation relationship does not occur between e8 and the adjacent links (e7, e9). This denotes that time slot No. 4 is capable of being allocated to e8.

For example, if the resources (temp_$t_i$, temp_$c_i$) which are to be allocated to the ith link are previously allocated to the adjacent link having the violation relationship with the ith link, the network coordinator node may increase temp_$t_i$ by one and may search for a next time slot in step S135. That is, the network coordinator node may continuously perform a process of increasing a number of the time slot (temp_$t_i$) by one until a time slot which is not occupied by the adjacent link having the violation ship is searched for.

Subsequently, in step S137, the network coordinator node may check whether a link (i.e., a link spaced apart from the ith link by a two-hop distance) having a collision relationship occupies the resources (temp_$t_i$, temp_$c_i$) which are to be allocated to the ith link. For example, in a case where the ith link is e8 of FIG. 11, links which are spaced apart from e8 by the two-hop distance may be e4, e5, e3, and e6. For example, in a case where resources (4, 1) are allocated to e8, since e6 having the collision relationship with e8 uses time slot No. 4 and frequency channel No. 1 (4, 1) as illustrated in FIG. 12, the collision relationship is established between e8 and e6.

When it is checked that the link having the collision relationship occupies the resources which are to be allocated to the ith link, in step S141, the network coordinator node may increase temp_$t_i$ by one to increase a temp_$c_i$ value by one so as to allocate another frequency channel. In this case, in step S143, the network coordinator node may check whether a corresponding node supports a corresponding frequency channel (temp_$c_i$+1). When the corresponding node does not support the corresponding frequency channel (temp_$c_i$+1), the network coordinator node may initialize the increased temp_$c_i$ to 1 and may increase temp_$t_i$ by one in step S145.

When it is checked in step S137 that the link having the collision relationship does not occupy the resources which are to be allocated to the ith the network coordinator node may store the values, stored in the variables temp_$t_i$, temp_$c_i$), in actual resource allocation variables ($t_i$, $c_i$).

A process performed in step S131 may be performed on the resource allocation values stored in the actual resource allocation variables ($t_i$, $c_i$), and if a result of the process does not satisfy the condition of step S133, the resource allocation values stored in the actual resource allocation variables ($t_i$, $c_i$) may be allocated as resources to the ith link (e8) in step S147.

Subsequently, in step S149, the network coordinator node may check whether resource allocation for all links is completed, and when the resource allocation is not completed, in step S153, the network coordinator node may increase the i value by one and may repeat processes of steps S129 to S147 on the i+1st link. The repeated processes may be continuously performed until the resource allocation for all links is completed.

Subsequently, in step S151, when the resource allocation for all links is completed, the network coordinator node may check whether an end-to-end maximum allowable time required by each communication path is satisfied, and if the end-to-end maximum allowable time is not satisfied, an algorithm may end in a resource allocation failure state. For example, if the end-to-end maximum allowable time is satisfied, the algorithm may end in a resource allocation success state.

As described above, a desired time slot length is minimized through all the processes, and an end-to-end transmission latency time is shortened, thereby enhancing multi-hop wireless network performance.

FIG. 13 is a diagram illustrating a link-based resource allocation schedule in wireless sensor networks having a tree structure illustrated in FIG. 11.

Referring to FIGS. 11 and 13, it can be seen that if the resource allocation method according to an embodiment of the present invention is applied, a data packet (sensor data or sensor information) transmitted from each of end nodes is transmitted to the network coordinator node within a time corresponding to at least four time slots, and if a frame length is capable of being set by a time corresponding to five time slots, all traffic occurring in the wireless sensor networks is stably transmitted.

In the embodiment of the FIG. 11, a traffic direction (or a data transmission direction) of uplink transmission from an end node to the network coordinator node is illustrated. However, in downlink transmission of which a traffic direction is opposite to the traffic direction of the uplink transmission, resources may be allocated in the same method. In this case, if a resource allocation algorithm is applied, the sequence of ranks may be opposite to that of uplink. However, if a main element which requests downlink resource allocation for a communication path is the network coordinator node, a process of exchanging a resource allocation request command message may be omitted, and a resource allocation response command message and a resource allocation notification command message may be exchanged for delivering a resource allocation schedule generated from the network coordinator node. If the main element which requests resource allocation is an end sensor node, a command message may be exchanged through the above-described method. A traffic direction of an HDR CTRL field of an exchanged message may be set to downlink, and the message may be exchanged.

Figure 14:
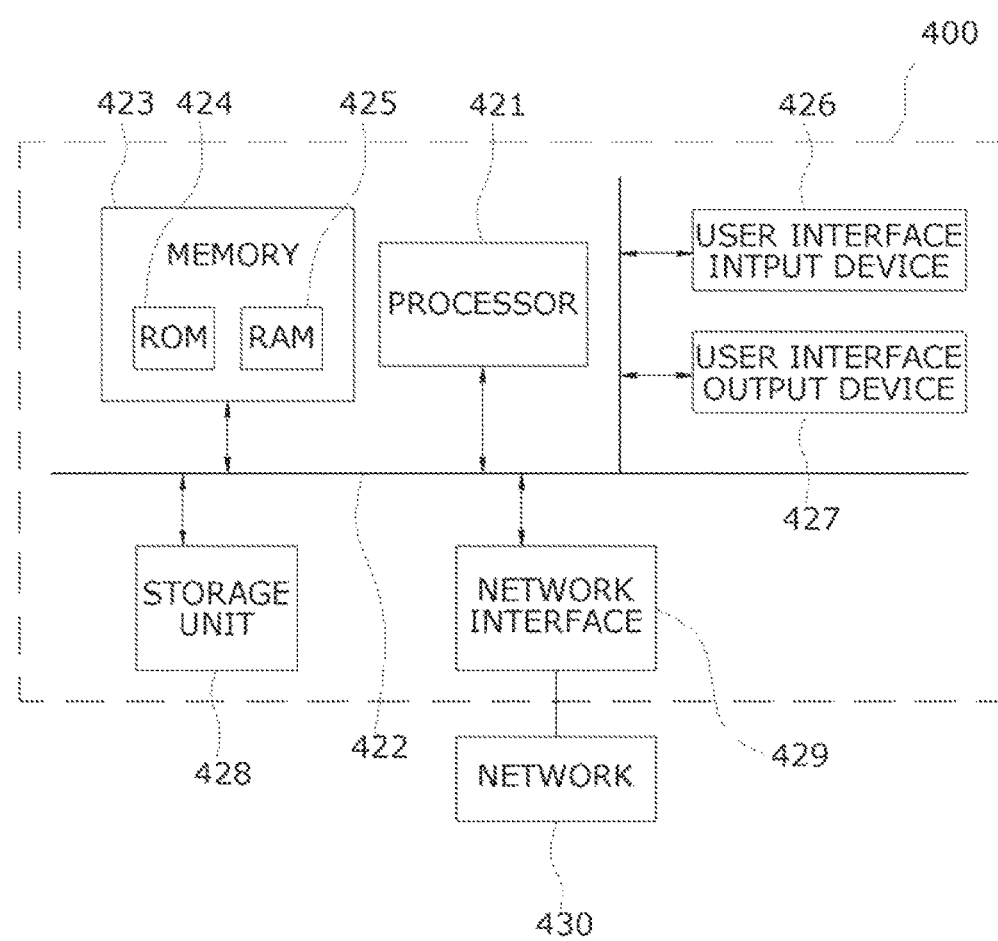
FIG. 14 is a block diagram illustrating a hardware configuration of each node device in a wireless sensor network according to an embodiment of the present invention.

FIG. 14 is a block diagram illustrating a hardware configuration of each node device 400 in wireless sensor networks according to an embodiment of the present invention.

Referring to FIG. 14, each node device 400 in the wireless sensor networks according to an embodiment of the present invention may include one or more processors 421, a memory 423, a user input device 426, a user output device 427, and a storage unit 428. The elements may communicate with each other through a bus 422. Also, each node device 400 may be a computer device. The computer device 400 may include a network interface 429 connected to a network 430.

The processors 421 may each be a central processing unit (CPU) or a semiconductor device that executes a processing command or a resource allocation algorithm stored in the memory 423 and/or the storage unit 428.

The memory 423 and the storage unit 428 may each include a volatile storage medium or a nonvolatile storage medium. For example, the memory 423 may include a read-only memory (ROM) 424 and a random access memory (RAM) 425.

The memory 423 and the storage unit 428 may each store the command or the resource allocation algorithm. In addition, the memory 423 and the storage unit 428 may each store a rule for generating the above-described resource allocation message exchange protocol.

The node according to an embodiment of the present invention may be implemented as a non-transitory computer-readable medium that includes a method implemented by a computer or computer-executable instructions stored in the computer. In an embodiment, when executed by a processor, the computer-readable instructions may perform a method according to at least one aspect of the invention.

In the resource allocation method in wireless sensor networks according to the embodiments of the present invention, a length of an allocated time slot necessary for transmission/reception of sensing data in multi-hop wireless sensor networks is minimized, and an end-to-end data transmission latency time is shortened, thereby enhancing network performance.

Moreover, in a case where the resource allocation method in wireless sensor networks according to the embodiments of the present invention is applied to a multi-super-frame defined in IEEE802.15.4e that is wireless sensor network standard, when resource allocation is performed on all links existing in networks, the resource allocation may be made at a shortest frame length. Accordingly, loss of energy which is consumed in a CAP for successfully transmitting data packets generated in all paths is small.

Moreover, sensing data is transmitted to a network coordinator within a short e, and thus, real time is ensured. In conclusion, the resource allocation method in wireless sensor networks according to the embodiments of the present invention is technology suitable for resource-constrained wireless sensor networks.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of allocating resources in a multi-hop wireless sensor network, the method comprising:
   (A) when two arbitrary adjacent links among links connecting all nodes have a violation relationship where the two arbitrary adjacent links occupy the same time slot, by a network coordinator node, allocating different time slots to the two arbitrary adjacent links according to a resource allocation request command message from each of nodes configuring the multi-hop wireless sensor network;
   (B) when two arbitrary links which are not adjacent to each other among the links are within a communication distance, by the network coordinator node, allocating different frequency channels to the two arbitrary links; and
   (C) when resource allocation for all of the links is completed according to steps (A) and (B), checking whether an end-to-end maximum allowable time required by each of paths established by the links is satisfied,
   wherein resources are allocated to each of the links according to a resource allocation schedule including steps (A) to (C).

2. The method of claim 1, wherein the resource allocation schedule is performed in descending power of rank values which are respectively set to the links.

3. The method of claim 1, wherein the resource allocation schedule is performed in ascending power of rank values which are respectively set to the links.

4. The method of claim 1, wherein the resource allocation schedule is performed in ascending power of rank values respectively set to the links, and then, is again performed in descending power of the rank values respectively set to the links, based on a link-based result of resource allocation which has been performed in ascending power of the rank values.

5. The method of claim 1, wherein the communication distance is a two-hop distance.

6. The method of claim 1, wherein the resource allocation request command message is collected from all of the nodes configuring the multi-hop wireless sensor network, and then, the resource allocation schedule is performed.

7. The method of claim 1, further comprising:
   transmitting a resource allocation response command message to the nodes in response to the resource allocation request command message, the resource allocation response command message including resource allocation schedule information generated based on the resource allocation schedule; and
   receiving a resource allocation notification command message, notifying completion of resource allocation, from the nodes which have received the resource allocation response command message.

8. The method of claim 7, wherein the resource allocation response command message comprises a plurality of fields in which resource allocation schedule information about nodes included in a communication path is recorded.

9. The method of claim 8, wherein the plurality of fields each comprise a field, in which time slot information generated through scheduling in step (A) is recorded, and a field in which frequency channel information generated through scheduling in step (B) is recorded.

10. The method of claim 9, wherein the field in which the time slot information is recorded comprises a field, in which SuperFrame ID is recorded, and a field in which Slot ID is recorded.

11. A node device for allocating resources to each of links connecting child nodes according to a resource allocation request command message from each of the child nodes configuring a multi-hop wireless sensor network, the node device comprising:
   a system bus;
   a memory configured to store a resource allocation algorithm for allocating the resources to each of the links; and
   a processor configured to execute the resource allocation algorithm, stored in the memory, through the system bus,
   wherein
   when two arbitrary adjacent links among the links connecting the child nodes have a violation relationship where the two arbitrary adjacent links occupy the same time slot, the processor allocates different time slots to the two arbitrary adjacent links according to the resource allocation request command message,
   when two arbitrary links which are not adjacent to each other among the links are within a communication distance, the processor allocates different frequency channels to the two arbitrary links, and
   when resource allocation for all of the links is completed, the processor allocates the resources to each of the links according to a resource allocation schedule which checks whether an end-to-end maximum allowable time required by each of paths established by the links is satisfied.

12. The node device of claim 11, wherein the processor allocates the resources to each of the links according to the resource allocation schedule which is performed in descending power of rank values respectively set to the links.

13. The node device of claim 11, wherein the processor allocates the resources to each of the links according to the resource allocation schedule which is performed in ascending power of rank values respectively set to the links.

14. The node device of claim 11, wherein the processor performs the resource allocation schedule in ascending power of rank values respectively set to the links, and then, again performs the resource allocation schedule in descending power of the rank values respectively set to the links, based on a link-based result of resource allocation which has been performed in ascending power of the rank values.

15. The node device of claim 11, wherein the processor allocates the resources to each of the links according to the resource allocation schedule which is performed after the resource allocation request command message is collected from all of the child nodes.

* * * * *